US007558729B1

(12) United States Patent
Benyassine et al.

(10) Patent No.: US 7,558,729 B1
(45) Date of Patent: Jul. 7, 2009

(54) MUSIC DETECTION FOR ENHANCING ECHO CANCELLATION AND SPEECH CODING

(75) Inventors: Adil Benyassine, Irvine, CA (US); Yang Gao, Mission Viejo, CA (US); Carlo Murgia, Aliso Viejo, CA (US); Eyal Shlomot, Long Beach, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 956 days.

(21) Appl. No.: 11/084,392

(22) Filed: Mar. 17, 2005

Related U.S. Application Data

(63) Continuation-in-part of application No. 10/981,022, filed on Nov. 4, 2004, now Pat. No. 7,120,576.

(60) Provisional application No. 60/588,445, filed on Jul. 16, 2004.

(51) Int. Cl.
*G10L 21/02* (2006.01)
*G10L 19/14* (2006.01)
*G10L 15/20* (2006.01)
*H04B 3/20* (2006.01)
*H04M 9/08* (2006.01)

(52) U.S. Cl. ....................... 704/226; 704/225; 704/233; 370/286; 379/406.01

(58) Field of Classification Search ....................... None
See application file for complete search history.

(56) References Cited

U.S. PATENT DOCUMENTS 5,274,705 A * 12/1993 Younce et al. ......... 379/406.05
6,424,635 B1 * 7/2002 Song .......................... 370/286
6,633,841 B1 * 10/2003 Thyssen et al. ............. 704/233
6,760,435 B1 * 7/2004 Etter et al. ............. 379/406.01
7,430,506 B2 * 9/2008 Nam et al. .................. 704/207
2007/0136053 A1 * 6/2007 Ebenezer .................... 704/208

OTHER PUBLICATIONS

Tanrikulu et al., "A new non-linear processor (NLP) for background continuity in echo control", 2003 IEEE International Conference on Acoustics, Speech, and Signal Processing, vol. 5, pp. 588-591, Apr. 6-10, 2003.*

Zhu et al, *Music Key Detection for Musical Audio*, Proceedings of the 11th International Multimedia Modeling conference 2005, IEEE, 30-37 (2005).

* cited by examiner

*Primary Examiner*—David R Hudspeth
*Assistant Examiner*—Brian L Albertalli
(74) *Attorney, Agent, or Firm*—Farjami & Farjami LLP

(57) ABSTRACT

A method of using music detection to enhance an operation of an echo canceller is provided, wherein the echo canceller includes an adaptive filter and a nonlinear processor. The method comprises receiving an input signal including an echo signal by the echo canceller from a near end device, filtering the input signal using the adaptive filter to eliminate linear components of the echo signal in the input signal and generate an error signal, analyzing the error signal using a music detector to determine existence of a music signal in the error signal, bypassing the nonlinear processor if the analyzing determines the music signal exists in the error signal, and eliminating nonlinear components of the echo signal from the error signal using the nonlinear processor if the analyzing determines the music signal does not exist in the error signal.

15 Claims, 6 Drawing Sheets

MUSIC DETECTION FOR ENHANCING ECHO CANCELLATION AND SPEECH CODING

RELATED APPLICATIONS

The present application is a Continuation-In-Part of U.S. patent application Ser. No. 10/981,022, filed Nov. 4, 2004 now U.S. Pat. No. 7,120,576, which claims priority to U.S. Provisional Application Ser. No. 60/588,445, filed Jul. 16, 2004, which are hereby incorporated by reference in their entirety.

BACKGROUND OF THE INVENTION

1. Field of the Invention

The present invention relates generally to using music detection to enhance speech communications. More particularly, the present invention relates to using music detection to enhance echo cancellation and speech coding.

2. Background Art

Conventional speech coding systems often employ voice activity detectors ("VADs") to examine speech signals and differentiate between voice and background noise. However, conventional VADs often cannot differentiate music from background noise. As is known in the art, background noise signals are typically fairly stable as compared to voice signals. The frequency spectrum of voice signals (or unvoiced signals) changes rapidly. In contrast to voice signals, background noise signals exhibit the same or similar frequency for a relatively long period of time, and therefore exhibit heightened stability. Therefore, in conventional approaches, differentiating between voice signals and background noise signals is fairly simple and is based on signal stability. Unfortunately, music signals are also typically relatively stable for a number of frames (e.g. several hundred frames). For this reason, conventional VADs often fail to differentiate between background noise signals and music signals, and exhibit rapidly fluctuating outputs for music signals.

If a conventional VAD determines that its input signal does not represent a voice signal, it will often simply classify its input signal as background noise and the signal will be encoded accordingly. However, the input signal may in fact comprise music and not background noise, and encoding a music signal as background noise will result in a low perceptual quality, or in this case, poor quality music. Further, classifying the signal as background noise would also cause conventional echo cancellers to eliminate a music signal by attenuating the signal below the noise floor and replacing the music signal by comfort noise if the comfort noise option is enabled, or with silence if the comfort noise option is disabled.

Thus, there is need in the art for methods and systems that can efficiently classify signals as music signals, and utilize such classification to improve the perceptual quality of such signals.

SUMMARY OF THE INVENTION

The present invention is directed to using music detection to enhance echo cancellation and speech coding. According to one aspect of the present invention, a method of using music detection to enhance an operation of an echo canceller is provided, wherein the echo canceller includes an adaptive filter and a nonlinear processor. The method comprises receiving an input signal including an echo signal by the echo canceller from a near end device, filtering the input signal using the adaptive filter to eliminate linear components of the echo signal in the input signal and generate an error signal, analyzing the error signal using a music detector to determine existence of a music signal in the error signal, bypassing the nonlinear processor if the analyzing determines the music signal exists in the error signal, and eliminating nonlinear components of the echo signal from the error signal using the nonlinear processor if the analyzing determines the music signal does not exist in the error signal.

In a further aspect, the method further uses the music detection to enhance an operation of a speech encoder including a noise suppressor, wherein the method further comprises bypassing the noise suppressor if the analyzing determines the music signal exists in the error signal, and attenuating the error signal using the noise suppressor if the analyzing determines the music signal does not exist in the error signal.

In another aspect, the method further uses the music detection to enhance an operation of a speech encoder including a noise suppressor, wherein the method further comprises gradually reducing an attenuation gain of the noise suppressor to zero if the analyzing determines the music signal exists in the error signal, and attenuating the error signal using the noise suppressor if the analyzing determines the music signal does not exist in the error signal.

In yet another aspect, the method further uses the music detection to enhance an operation of a speech encoder including a pitch interpolation, wherein the method further comprises disabling the pitch interpolation if the analyzing determines the music signal exists in the error signal, transmitting information to a decoder to disable a pitch interpolation of the decoder if the analyzing determines the music signal exists in the error signal, and enabling the pitch interpolation if the analyzing determines the music signal does not exist in the error signal.

In an additional aspect, the method further uses the music detection to enhance an operation of a speech encoder including a pitch pre-processing, wherein the method further comprises disabling the pitch pre-processing if the analyzing determines the music signal exists in the error signal, and enabling the pitch pre-processing if the analyzing determines the music signal does not exist in the error signal.

In other aspects of the present invention, enhanced echo cancellers and speech encoders, and related computer readable medium including a computer software product executable by a processor to use music detection for enhancing operations of the echo cancellers and speech encoders are provided according to the aforementioned methods.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
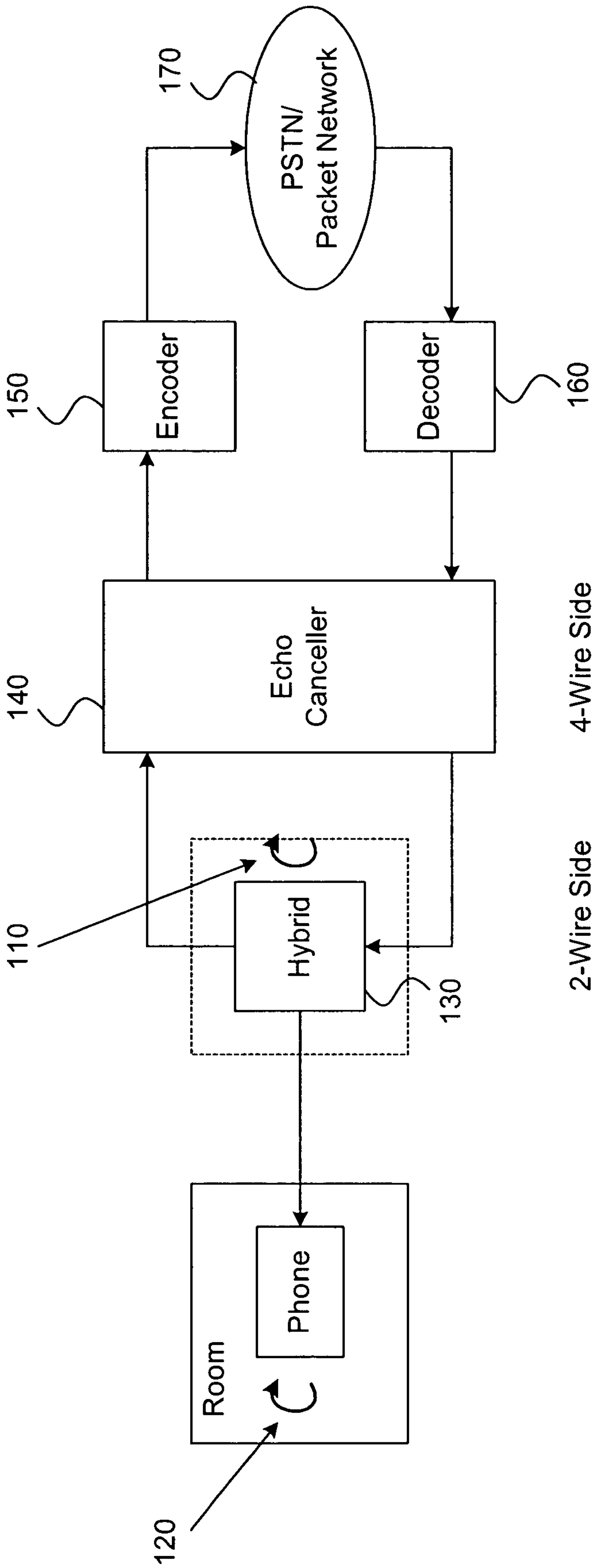
FIG. 1 (Prior Art)
FIG. 1 illustrates a block diagram of a conventional communication system showing a placement of an echo canceller in an access network.

The present invention is directed to a low-complexity music detection algorithm and system. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Subscribers use speech quality as the benchmark for assessing the overall quality of a telephone network. A key technology to provide a high quality speech is echo cancellation. Echo canceller performance in a telephone network, either a TDM or packet telephony network, has a substantial impact on the overall voice quality. An effective removal of hybrid and acoustic echo inherent in telephone networks is a key to maintaining and improving perceived voice quality during a call.

Echoes occur in telephone networks due to impedance mismatches of network elements, acoustical coupling within telephone handsets, or room acoustic reflections when a speaker phone is used. Hybrid echo is the primary source of echo generated from the public-switched telephone network (PSTN). As shown in FIG. 1, hybrid echo 110 is created by a hybrid, which converts a four-wire physical interface into a two-wire physical interface. The hybrid reflects electrical energy back to the speaker from the four-wire physical interface. Acoustic echo, on the other hand, is generated by analog and digital telephones, with the degree of echo related to the type and quality of such telephones. As shown in FIG. 1, acoustic echo 120 is created by a voice coupling between the earpiece and microphone in the telephones handset, where sound from the speaker is picked by the microphone. For a speakerphone, the echo is created also by bouncing off the walls, windows, and the like. The result of this reflection is the creation of an echo, which would be heard by the speaker unless eliminated.

As shown in FIG. 1, in modern telephone networks, echo canceller 140 is typically positioned between hybrid 130 and network 170. Generally speaking, echo cancellation process involves two steps. First, as the call is set up, echo canceller 140 employs a digital adaptive filter to create a model based on the echo of the far-end signal as reflected by hybrid 130. After the near-end signal passes through hybrid 130, echo canceller 140 subtracts the far-end echo model from the near-end signal to cancel hybrid echo. Although this echo cancellation process removes a substantial amount of the echo, non-linear components of the echo may still remain. To cancel non-linear components of the echo, the second step of the echo cancellation process utilizes a non-linear processor (NLP) to eliminate the remaining or residual echo by attenuating the signal below the noise floor. Echo canceller 140 is described in more detail in conjunction with FIG. 2 of the present application.

As further shown in FIG. 1, encoder 150 and decoder 160 are placed between echo canceller 140 and network 170. Encoder 150 receives speech signals from echo canceller 140 and generates coded speech signals, according to a variety of speech coding standards, such as G.711, G.729, G.723.1, and the like. Encoder 150 is described in more detail in conjunction with FIG. 3 of the present application. Decoder 160 also receives coded speech signals from network 170 and decodes the coded speech signals to generate speech signals.

Figure 2:
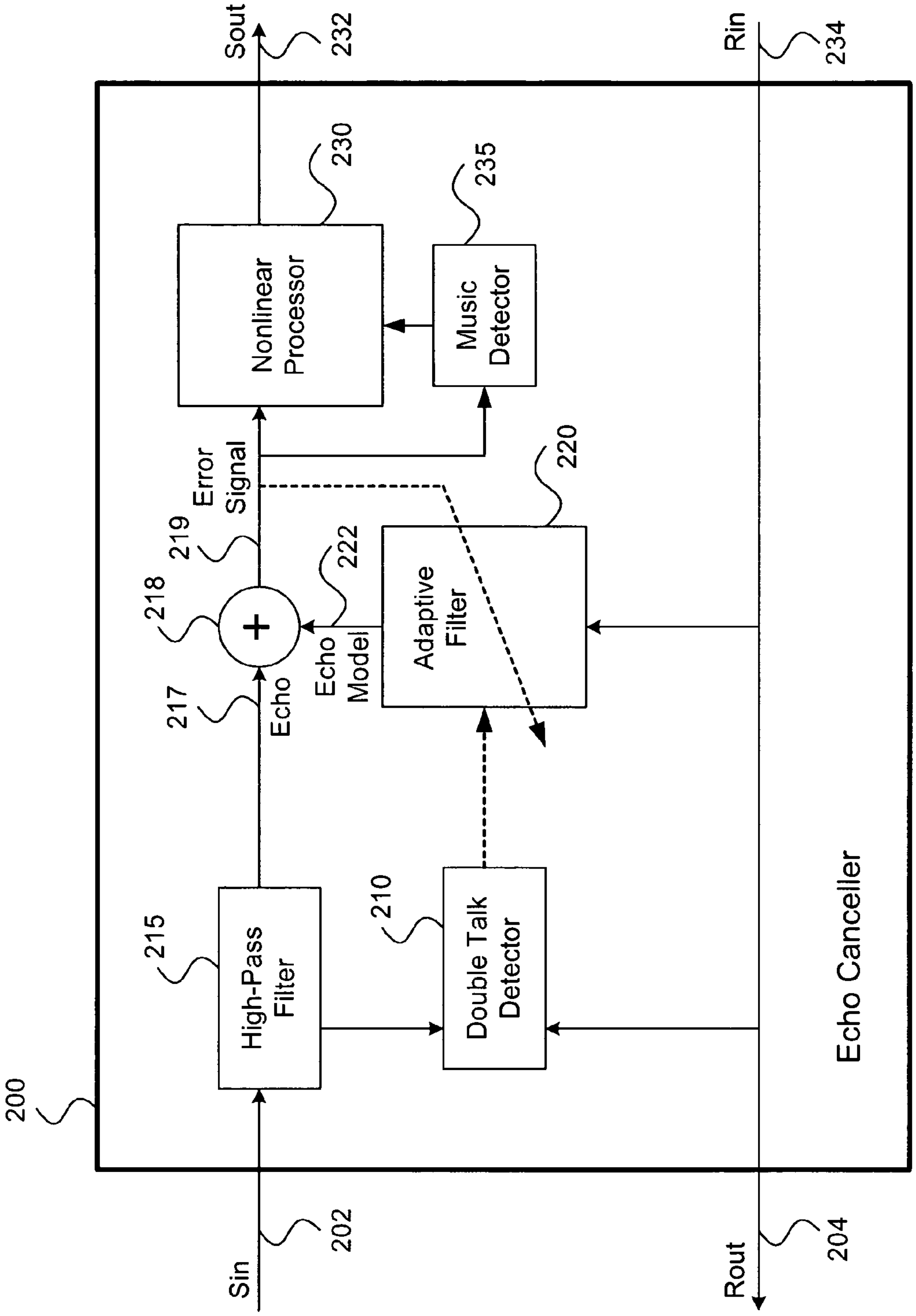
FIG. 2 illustrates a block diagram of an echo canceller, according to one embodiment of the present invention.

FIG. 2 illustrates a block diagram of echo canceller 200, according to one embodiment of the present invention. As shown, echo canceller 200 includes double talk detector 210, high-pass filter 215, adaptive filter 220, error estimator 218, nonlinear processor 230 and music detector 235. During its operation, echo canceller 200 receives Rin signal 234 from the far end, which is fed to double talk detector 210, and then passed through to the hybrid, e.g. see hybrid 130 of FIG. 1, as Rout signal 204 to the near end. As discussed above, the hybrid causes Rout signal 204 to be reflected as Sin signal 202 from the near end, which is fed to high pass filter 215, and an output of high pass filter 215 is fed to double talk detector 210. High-pass filter 215, which is placed at the transmitting side of echo canceller 200, removes DC component from Sin signal 202.

Double talk detector 210 controls the behavior of adaptive filter 220 during periods when Sin signal 202 from the near end reaches a certain level. Because echo canceller 200 is utilized to cancel an echo of Rin signal 234 from the far end, presence of speech signal from the near end would cause adaptive filter 220 to converge on a combination of near end speech signal and Rin signal 234, which will lead to an inaccurate echo path model, i.e. incorrect adaptive filter 220 coefficients. Therefore, in order to cancel the echo signal, adaptive filter 220 should not train in the presence of the near end speech signal. To this end, echo canceller 200 must analyze the incoming signal and determine whether it is solely an echo signal of Rin signal 234 or also contains the speech of a near end talker. By convention, if two people are talking over a communication network or system, one person is referred to as the "near talker," while the other person is referred to as the "far talker." The combination of speech signals from the near end talker and the far end talker is referred to as "double talk."

To determine whether Sin signal 202 contains double talk, double talk detector 210 estimates and compares the characteristics of Rin signal 234 and Sin signal 202. A primary purpose of double talk detector is to prevent adaptive filter 220 from adaptation when double talk is detected or to adjust the degree of adaptation based on confidence level of double talk detection, which is described in U.S. Pat. No. 6,804,203, entitled "Double Talk Detector for Echo Cancellation in a Speech Communication System", which is hereby incorporated by reference in is entirety.

Echo canceller 200 utilizes adaptive filter 220 to model the echo path and its delay. In one embodiment, adaptive filter 220 uses a transversal filter with adjustable taps, where each tap receives a coefficient that specifies the magnitude of the corresponding output signal sample and each tap is spaced a sample time apart. The better the echo canceller can estimate what the echo signal will look like, the better it can eliminate the echo. To improve the performance of echo canceller 200, it may be desirable to vary the adaptation rate at which the transversal filter tap coefficients of adaptive filter 220 are adjusted. For instance, if double talk detector 210 denotes a high confidence level that the incoming signal is an echo signal, it is preferable for adaptive filter 220 to adapt quickly. On the other hand, if double talk detector 210 denotes a low confidence level that the incoming signal is an echo signal, i.e. it may include double talk, it is preferable to decline to adapt at all or to adapt very slowly. If there is an error in determining whether Sin signal 202 is an echo signal, a fast adaptation of adaptive filter 220 causes rapid divergence and a failure to eliminate the echo signal.

As shown in FIG. 2, adaptive filter 220 produces echo model signal 222 based on Rin signal 234 from the far end. Error estimator 218 receives echo signal 217, which is the output of high-pass filter 215, and subtracts echo model signal 222 from echo signal 217 to generate residual echo signal or error signal 219. Adaptive filter 220 also receives error signal 219 and updates its coefficients based on error signal 219.

It is known that the echo path includes nonlinear components that cannot be removed by adaptive filter 220 and, thus, after subtraction of echo model signal 222 from echo signal 217, there remains residual echo, which must be eliminated by nonlinear processor (NLP) 230. As shown NLP 230 receives residual echo signal or error signal 219 from error estimator 218 and generates Sout 220 for transmission to far end. If error signal 219 is below a certain level, NLP 230 replaces the residual echo with either comfort noise if the comfort noise option is enabled, or with silence if the comfort noise option is disabled.

With continued reference to FIG. 2, echo canceller 200 includes music detector 235, which is utilized by echo canceller 200 to detect music signals in error signal 219. In one embodiment, music detector 235 detects music signals according to the music detection algorithm described in FIG. 5 of the present application. However, music detector 235 can use any music detection algorithm and is not limited to the algorithm described in conjunction with FIG. 5 of the present application. Further, in other embodiment, music detection can be performed outside of echo canceller 200, and a music detection signal can be received by echo canceller 200 for use by nonlinear processor 230. In one embodiment, if music detector 235 detects a music signal in error signal 219, NLP 230 is disabled to prevent NLP 230 from attenuating error signal 219, such that error signal 219 is transmitted as Sout 232. However, if music detector 235 does not detect a music signal, NLP 230 is enabled to operate on error signal 219, as described above.

Figure 3:
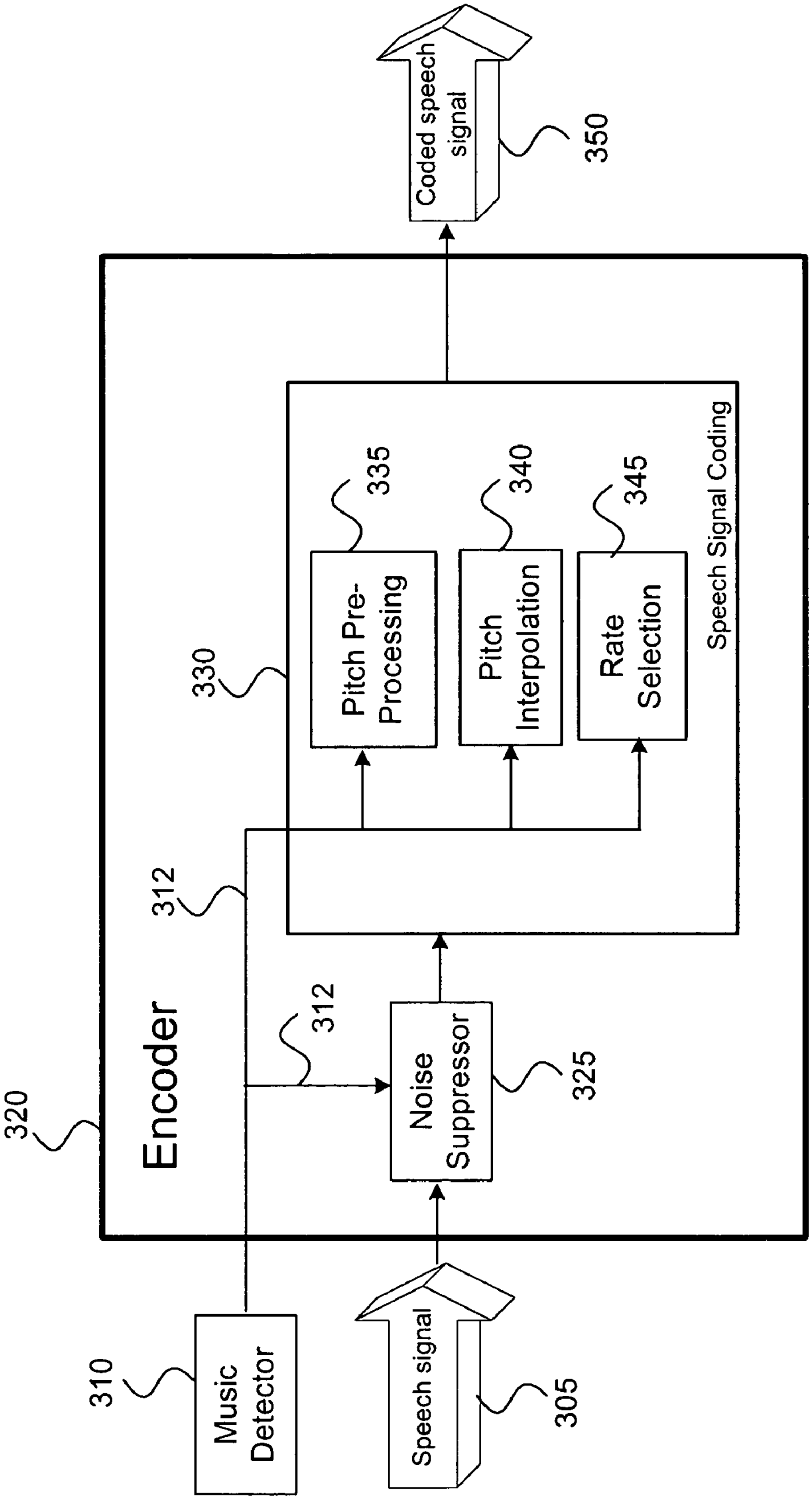
FIG. 3 is a system diagram illustrating a speech coding system, according to one embodiment of the invention.

FIG. 3 is a system diagram illustrating a speech coding system, according to one embodiment of the invention. As shown in FIG. 3, speech signal 305 is received by encoder 320, which encodes speech signal 305 to generate coded speech signal 350, using one of various coding algorithms, such as CELP coding. FIG. 3 further shows music detector 310, which is similar to music detector 235, and which supplies music detect signal 312 to various components of encoder 320, such as noise suppressor 325, pitch pre-processing 335, pitch interpolation 340 and rate selection 345. Although music detector 310 is shown outside of encoder 320, in some embodiments, music detector 310 can be integrated within encoder 320.

Noise suppressor 325 attenuates speech signal 305 in order to eliminate background noise and to provide the listener with a clear sensation of the environment. In one embodiment, noise suppressor 325 includes a channel gain calculation module (not shown), which receives music detect signal 312. Music detector signal 312 indicates to noise suppressor 325 whether music detector 310 has detected music signal in speech signal 305. Music detector signal 312 is fed into channel gain calculation module of noise suppressor 325 to compute the gain, so as to improve the speech quality. In some embodiments, noise suppressor 325 may be bypassed if music detector detects music signal in speech signal 305. In other embodiments, channel gain calculation module may gradually bring the gin to 0 dB, i.e. no attenuation, to provide a smooth transition and avoid discontinuities in speech signal 305. However, if a music signal is not detected, noise suppressor 325 operates on speech signal 305.

Next, as pre-processed speech signal emerges from noise suppressor 325, speech signal coding module 330 starts the encoding process of the pre-processed speech signal at certain frame intervals, such as 20 ms frame intervals. At this stage, for each speech frame, several parameters are extracted from the pre-processed speech signal, such as spectrum and pitch estimate parameters, which may be used in the coding scheme, and other parameters, such as maximal sample in a frame, zero crossing rates, LPC gain or signal sharpness parameters, which may be used for classification and rate determination purposes.

As shown in FIG. 3, speech signal coding module 330 includes pitch pre-processing 335, pitch interpolation 340, rate selection 345, and other speech coding modules that are known to those ordinary skill in the art and are not shown to maintain brevity. Pitch pre-processing 335 is used to modify the speech characteristics or parameters of speech signal 305 in order to ease the encoding process, for example, using a CELP coder, as described in U.S. Pat. No. 6,507,814, entitled "Pitch Determination Using Speech Classification and Prior Pitch Estimation", which is hereby incorporated by reference in its entirety. In one embodiment, when music detector detects music signal in speech signal 305, pitch pre-processing 335 is bypassed or disabled, so that the speech characteristics or parameters are not modified by pitch pre-processing 335. However, if a music signal is not detected, pitch pre-processing 335 is enabled. Further, pitch interpolation 340, which is used to improve naturalness of voice speech signal, is bypassed or disabled when music detector detects music signal in speech signal 305, and corresponding information is transmitted to the decoder to ensure that pitch interpolation is not performed by the decoder as well. But, if a music signal is not detected, pitch interpolation 340 is enabled. In addition, for multi-rate coding algorithm, when music detector detects music signal in speech signal 305, rate selection 345 selects a high bit rate, such as the maximum available bit rate, in order to provide a high perceptual quality.

Figure 4:
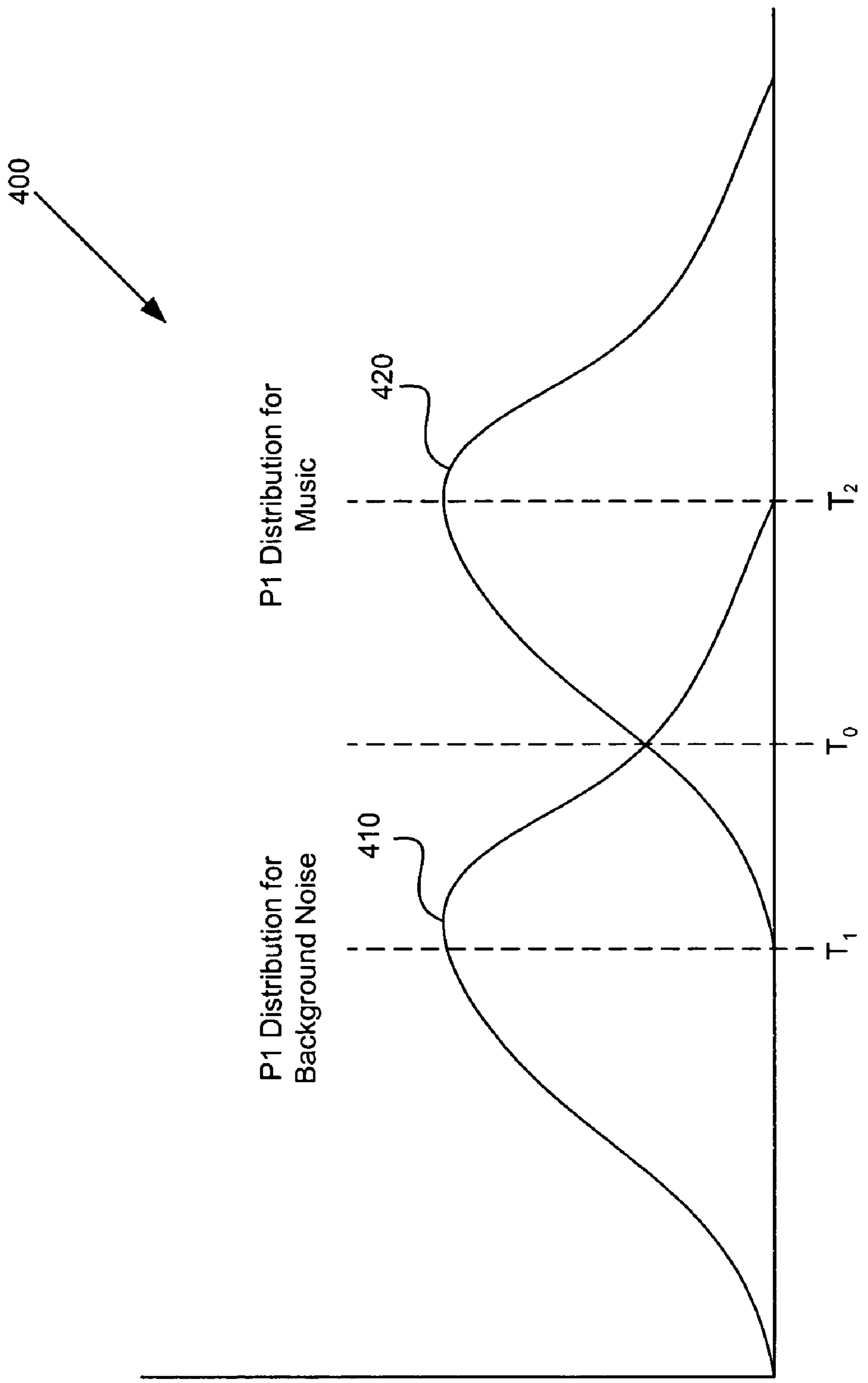
FIG. 4 is a distribution graph of a speech coding parameter for background noise and music, according to one embodiment of the invention.

FIG. 4 illustrates distribution graph 400 of a speech coding parameter for background noise and music, according to one embodiment of the invention. Background noise distribution 410 and music distribution 420 are shown for example samples of music and noise, respectively, taken over a period of time. The horizontal axis represents the value of an example speech coding parameter $P_1$, and the vertical axis represents the probability that the parameter will have the respective value on the horizontal axis. The speech coding parameter $P_1$ can be calculated by a speech coder, such as a G.729 coder. Speech coding parameter $P_1$ can represent various speech coding parameters, including pitch correlation ($R_p$), linear prediction coding (LPC) gain, and the like. In one embodiment, a single speech coding parameter $P_1$ can be used for differentiating between music and background noise, as discussed below. However, in other embodiments, more than one speech coding parameter may be used, which can represent multi-dimensional vectors, and which are discussed herein.

Referring to FIG. 4, threshold value $T_1$ represents the value of $P_1$ to the left of which the speech frame being processed is deemed to be background noise. Likewise, threshold value $T_2$ represents the value of $P_1$ to the right of which the speech frame being processed is deemed to be music. Threshold value $T_0$ represents the value of $P_1$ at the intersection of background noise distribution 410 and music distribution 420. In the example shown, music distribution 420 and background noise distribution 410 can represent the distribution of the pitch correlation ($R_p$) for music frames and background noise frames, respectively. It should be noted that for other speech coding parameters, background noise distribution 410 might be to the right of music distribution 420 depending upon what parameter $P_1$ represents.

Since in one embodiment, speech coding parameter $P_1$, such as the pitch correlation ($R_p$), has already been calculated by the speech coder, such as the G.729 coder, the present scheme substantially reduces complexity and time by receiving speech coding parameter $P_1$ from the speech coder and using the same to differentiate between background noise and music in a VAD module, such as VAD circuitry 140 or a VAD software module, for example.

In one embodiment, for a given speech frame under examination, if $P_1$ is less than $T_1$ (or in closer range of $T_1$ than to $T_0$) then $P_1$ is indicative of background noise. If $P_1$ is greater than $T_2$ (or in closer range of $T_2$ than $T_0$) then $P_1$ is indicative of music. However, if $P_1$ falls in the range between $T_1$ and $T_2$ then additional computation is required to determine whether $P_1$ is indicative of background noise or music. The flowchart of FIG. 5 illustrates one example approach for determining whether the speech signal is music or background noise if $P_1$ falls in the range between $T_1$ and $T_2$.

Figure 5:
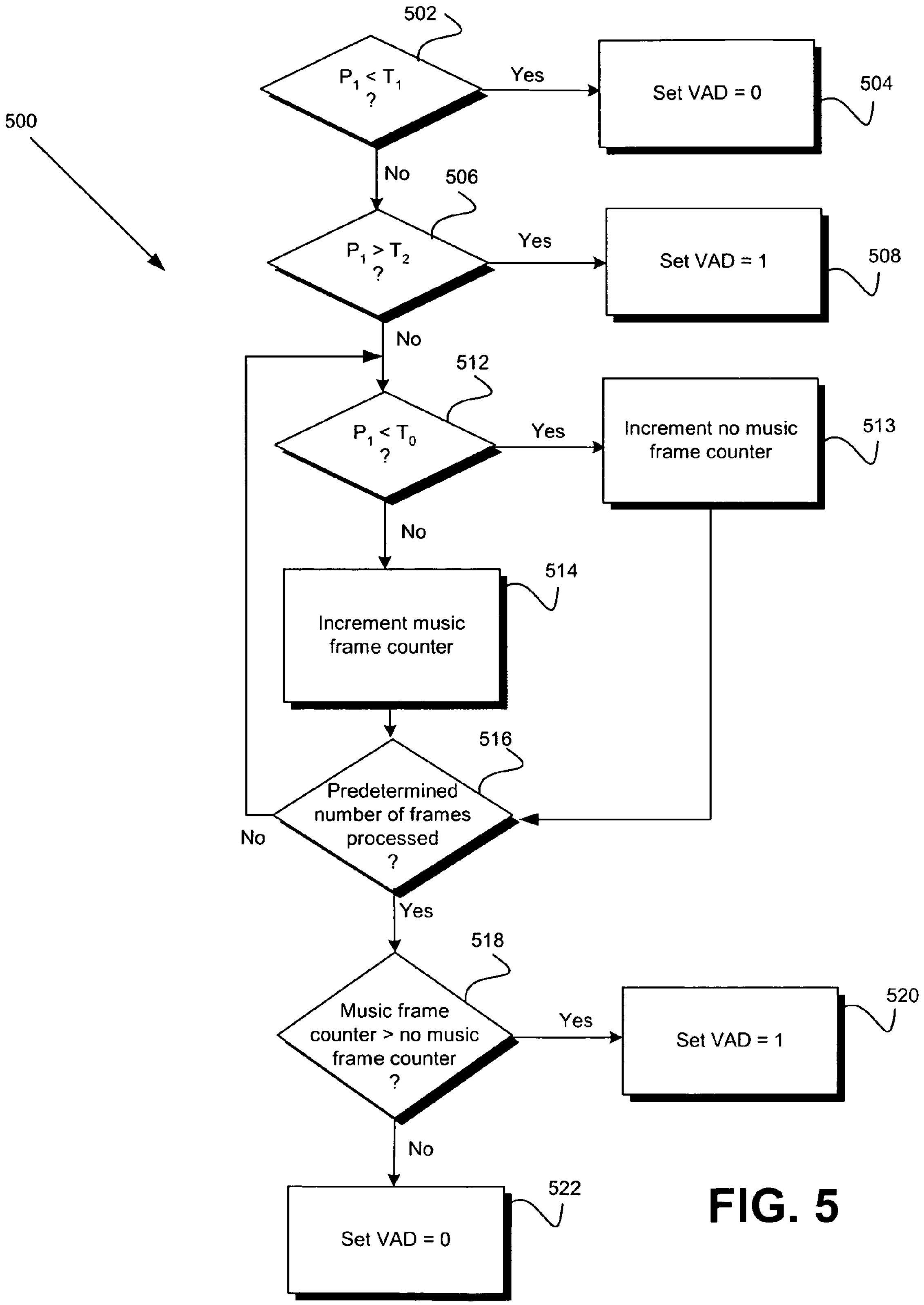
FIG. 5 illustrates a method of differentiating background noise from music using one parameter, according to one embodiment of the invention.

In one embodiment, according to FIG. 5, the process begins by examining the value of speech coding parameter $P_1$, such as pitch correlation, for a given speech frame. At the outset, the VAD may be set to a default value to indicate music or speech (as opposed to background noise, for example), such that a high bit-rate coder is utilized to code the frames. In this way, even though more bandwidth is used to code the frame, the coding system favors quality in the event that the speech signal is in fact a music signal. As shown in FIG. 5, at step 502, speech coding parameter $P_1$ is received from the speech coder and if it is less than $T_1$ then the frame is classified as background noise and the VAD output is set to zero in step 504 to indicate the same. Otherwise, the process moves to step 506 and if $P_2$ is greater than $T_2$ then the frame is classified as music and at step 508 the VAD is set to one to indicate the same. However, if speech coding parameter $P_1$ falls in between $T_1$ and $T_2$, then the process moves to step 512 for additional calculations for a predetermined number of frames, such as 100 to 200 frames for example.

At step 512, if $P_1$ is less than $T_0$ then the no music frame counter (cnt_nomus) is incremented at step 513. If $P_1$ is not less than $T_0$ at step 512 then the process proceeds to step 514. Otherwise, if $P_1$ is greater than $T_0$ then the music frame counter (cnt_mus) is incremented at step 514.

At step 516, a check is made to determine if the predetermined number of speech frames have been processed. If there is another speech frame to be examined, the process loops back to step 512. However, if the predetermined number of speech frames have been processed the process proceeds to step 518.

At step 518, the value of the music frame counter is compared to the value of the no music frame counter. If the music frame counter is greater than the no music frame counter (or in one embodiment, it is greater than the no music frame counter by a threshold value W), then the process proceeds to step 520, where the frame is classified as music and the VAD is set to one to indicate the same. Otherwise, the process proceeds to step 522, where the frame is classified as background noise and the VAD is set to zero to indicate the same.

In one embodiment, the VAD may have more than two output values. For example, in one embodiment, VAD may be set to "zero" to indicate background noise, "one" to indicate voice, and "two" to indicate music. Further, after the speech signal is classified as music and the speech frames are being coded accordingly, if a non-music speech frame is detected for a given period of time (or an extension period), such as a time period for processing 30 frames, the detection system continues to indicate that a music signal is being detected until it is confirmed that the music signal has ended in order to avoid glitches in coding. In another embodiment, two speech coding parameters, such as pitch correlation ($R_p$) and linear prediction coding (LPC) gain, can be utilized to differentiate music from background noise.

Figure 6:
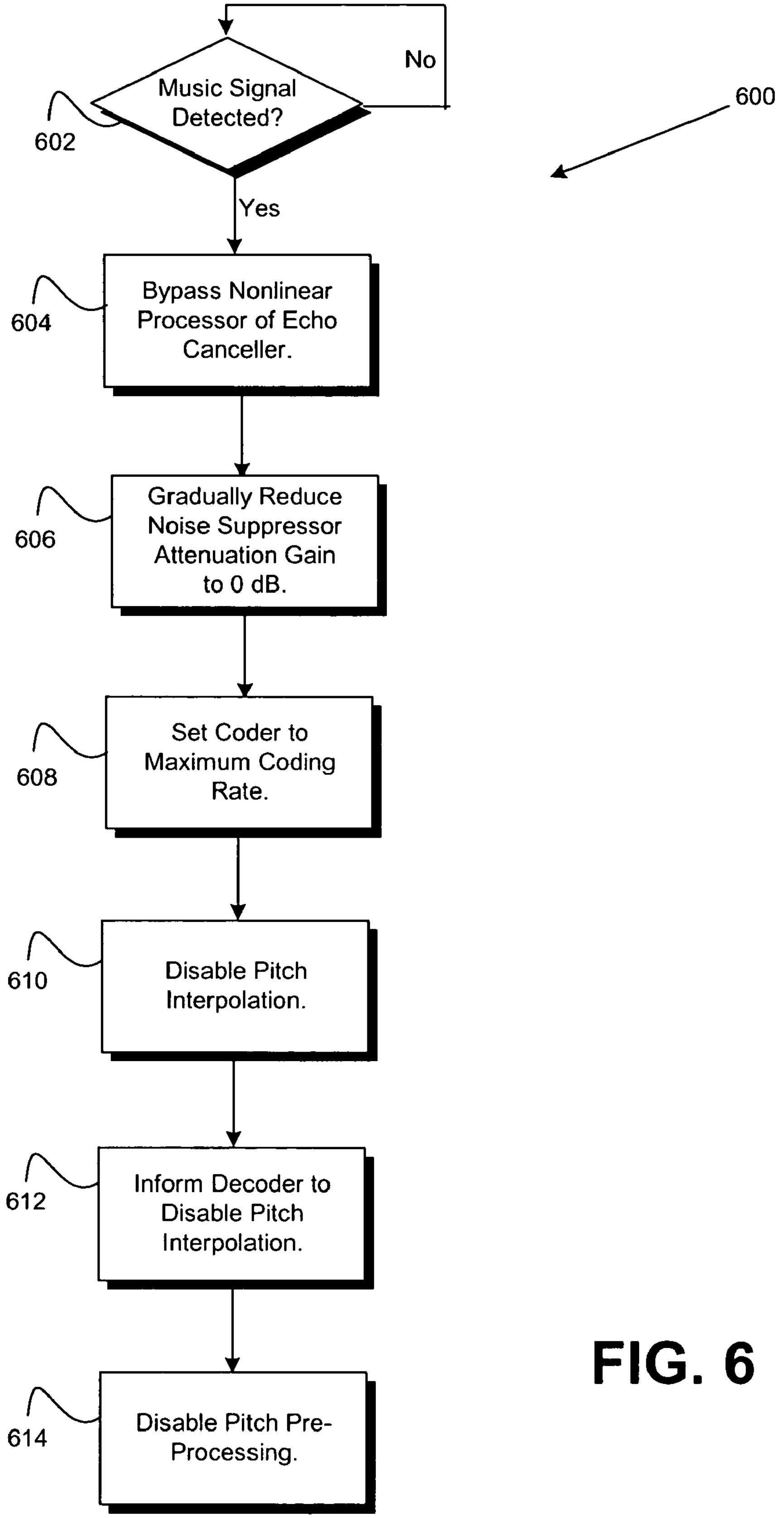
FIG. 6 illustrates a method of using music detection to enhance echo cancellation and speech coding, according to one embodiment of the invention.

FIG. 6 illustrates method 600 for using music detection to enhance echo cancellation and speech coding, according to one embodiment of the invention. As shown, at step 602, method 600 determines if a music signal is detected. If a music signal is not detected, method 600 remains at step 602. However, when a music signal is detected, method 600 moves to step 604, where echo canceller 200 bypasses nonlinear processing of error signal 219 in order to avoid degradation of the perceptual quality of the music signal.

Next, at step 606, noise suppressor 325 gradually brings the gain to 0 dB, i.e. no attenuation, to provide a smooth transition and avoid discontinuities in speech signal 305. In some embodiments, however, noise suppressor 325 may be bypassed at step 606 if music detector detects music signal in speech signal 305. At step 608, for multi-rate coding algorithm, when music detector detects music signal in speech signal 305, rate selection 345 selects a high bit rate, such as the maximum available bit rate, in order to provide a high perceptual quality.

With continued reference to FIG. 6, at step 608, pitch interpolation 340, which is used to improve naturalness of voice speech signal, is bypassed when music detector detects music signal in speech signal 305 and, at step 612, corresponding information is transmitted to the decoder to ensure that pitch interpolation is not performed by the decoder. Next, at step 614, pitch pre-processing 335 is bypassed, so that the speech characteristics or parameters are not modified by pitch pre-processing 335.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method executable by a processor for using music detection to enhance an operation of an echo canceller and a speech encoder including a noise suppressor, the echo canceller including an adaptive filter and a nonlinear processor, the method comprising:

receiving an input signal including an echo signal by the echo canceller from a near end device;

filtering the input signal using the adaptive filter to eliminate linear components of the echo signal in the input signal and generate an error signal;

analyzing the error signal using a music detector to determine existence of a music signal in the error signal;

bypassing the nonlinear processor if the analyzing determines the music signal exists in the error signal;

eliminating nonlinear components of the echo signal from the error signal using the nonlinear processor if the analyzing determines the music signal does not exist in the error signal;

gradually reducing an attenuation gain of the noise suppressor to zero if the analyzing determines the music signal exists in the error signal; and attenuating the error signal using the noise suppressor if the analyzing determines the music signal does not exist in the error signal.

2. The method of claim 1 further comprising:

bypassing the noise suppressor if the analyzing determines the music signal exists in the error signal.

3. The method of claim 1, wherein the music detector determines existence of the music signal in the error signal by:

defining a music threshold value for a first parameter extracted from a frame of the error signal;

defining a background noise threshold value for the first parameter;

defining an unsure threshold value for the first parameter, wherein the unsure threshold value falls between the music threshold value and the background noise threshold value;

wherein if the first parameter does not fall between the music threshold value and the background noise threshold value, classifying the error signal as music if the first parameter is in closer range of the music threshold value than the unsure threshold value; and classifying the error signal as background noise if the first parameter is in closer range of the background noise threshold value than the unsure threshold value;

wherein if the first parameter falls between the music threshold value and the background noise threshold value, classifying the error signal as music or background noise based on analyzing a plurality of first parameters extracted from the plurality of frames.

4. A method executable by a processor for using music detection to enhance an operation of an echo canceller and a speech encoder including a pitch interpolation, the echo canceller including an adaptive filter and a nonlinear processor, the method comprising:

receiving an input signal including an echo signal by the echo canceller from a near end device;

filtering the input signal using the adaptive filter to eliminate linear components of the echo signal in the input signal and generate an error signal;

analyzing the error signal using a music detector to determine existence of a music signal in the error signal;

bypassing the nonlinear processor if the analyzing determines the music signal exists in the error signal;

eliminating nonlinear components of the echo signal from the error signal using the nonlinear processor if the analyzing determines the music signal does not exist in the error signal;

disabling the pitch interpolation if the analyzing determines the music signal exists in the error signal;

transmitting information to a decoder to disable a pitch interpolation of the decoder if the analyzing determines the music signal exists in the error signal; and enabling the pitch interpolation if the analyzing determines the music signal does not exist in the error signal.

5. A method executable by a processor for using music detection to enhance an operation of an echo canceller and a speech encoder including a pitch pre-processing, the echo canceller including an adaptive filter and a nonlinear processor, the method comprising:

receiving an input signal including an echo signal by the echo canceller from a near end device;

filtering the input signal using the adaptive filter to eliminate linear components of the echo signal in the input signal and generate an error signal;

analyzing the error signal using a music detector to determine existence of a music signal in the error signal;

bypassing the nonlinear processor if the analyzing determines the music signal exists in the error signal;

eliminating nonlinear components of the echo signal from the error signal using the nonlinear processor if the analyzing determines the music signal does not exist in the error signal;

disabling the pitch pre-processing if the analyzing determines the music signal exists in the error signal; and enabling the pitch pre-processing if the analyzing determines the music signal does not exist in the error signal.

6. An enhanced speech processing system comprising:

a processor configured to use music detection to enhance an operation of an echo canceller and a speech encoder;

the echo canceller including:

a receiver configured to receive an input signal including an echo signal from a near end device;

an adaptive filter configured to filter the input signal using the adaptive filter to eliminate linear components of the echo signal in the input signal and generate an error signal;

a music detector configured to analyze the error signal using a music detector to determine existence of a music signal in the error signal; and a nonlinear processor configured to eliminate nonlinear components of the echo signal from the error signal if the analyzing determines the music signal does not exist in the error signal;

wherein the nonlinear processor is bypassed if the analyzing determines the music signal exists in the error signal; and the speech encoder including a noise suppressor, wherein the speech encoder is configured to:

gradually reduce an attenuation gain of the noise suppressor to zero if the music detector determines the music signal exists in the error signal; and attenuate the error signal using the noise suppressor if the music detector determines the music signal does not exist in the error signal.

7. The enhanced speech processing system of claim 6, wherein the speech encoder bypasses the noise suppressor if the music detector determines the music signal exists in the error signal.

8. The enhanced speech processing system of claim 6, wherein the music detector comprises:

a module for defining a music threshold value for a first parameter extracted from a frame of the error signal;

a module for defining a background noise threshold value for the first parameter;

a module for defining an unsure threshold value for the first parameter, wherein the unsure threshold value falls between the music threshold value and the background noise threshold value;

a module for classifying the error signal as music if the first parameter is in closer range of the music threshold value than the unsure threshold value, if the first parameter does not fall between the music threshold value and the background noise threshold value;

a module for classifying the error signal as background noise if the first parameter is in closer range of the background noise threshold value than the unsure threshold value, if the first parameter does not fall between the music threshold value and the background noise threshold value;

a module for classifying the error signal as music or background noise based on analyzing a plurality of first parameters extracted from the plurality of frames, if the first parameter falls between the music threshold value and the background noise threshold value.

9. An enhanced speech processing system comprising:

a processor configured to use music detection to enhance an operation of an echo canceller and a speech encoder;

the echo canceller including:

a receiver configured to receive an input signal including an echo signal from a near end device;

an adaptive filter configured to filter the input signal using the adaptive filter to eliminate linear components of the echo signal in the input signal and generate an error signal;

a music detector configured to analyze the error signal using a music detector to determine existence of a music signal in the error signal; and a nonlinear processor configured to eliminate nonlinear components of the echo signal from the error signal if the analyzing determines the music signal does not exist in the error signal;

wherein the nonlinear processor is bypassed if the analyzing determines the music signal exists in the error signal; and the speech encoder including a pitch interpolation, wherein the speech encoder is configured to:

disable the pitch interpolation if the music detector determines the music signal exists in the error signal, transmit information to a decoder to disable a pitch interpolation of the decoder if the music detector determines the music signal exists in the error signal, and enable the pitch interpolation if the music detector determines the music signal does not exist in the error signal.

10. An enhanced speech processing system comprising:

a processor configured to use music detection to enhance an operation of an echo canceller and a speech encoder;

the echo canceller including:

a receiver configured to receive an input signal including an echo signal from a near end device;

an adaptive filter configured to filter the input signal using the adaptive filter to eliminate linear components of the echo signal in the input signal and generate an error signal;

a music detector configured to analyze the error signal using a music detector to determine existing of a music signal in the error signal; and a nonlinear processor configured to eliminate nonlinear components of the echo signal from the error signal if the analyzing determines the music signal does not exist in the error signal;

wherein the nonlinear processor is bypassed if the analyzing determines the music signal exists in the error signal; and the speech encoder including a pitch pre-processor, wherein the speech encoder is configured to:

disable the pitch pre-processor if the music detector determines the music signal exists in the error signal, and enable the pitch pre-processor if the music detector determines the music signal does not exist in the error signal.

11. A computer readable medium including a computer software product executable by a processor to use music detection for enhancing an operation of an echo canceller and a speech encoder including a noise suppressor, the echo canceller including an adaptive filter and a nonlinear processor, the computer software product comprising:

code for receiving an input signal including an echo signal by the echo canceller from a near end device;

code for filtering the input signal using the adaptive filter to eliminate linear components of the echo signal to the input signal and generate an error signal;

code for analyzing the error signal using a music detector to determine existence of a music signal in the error signal;

code for bypassing the nonlinear processor if the code for analyzing determines the music signal exists in the error signal;

code for eliminating nonlinear components of the echo signal from the error signal using the nonlinear processor if the code for analyzing determines the music signal does not exist in the error signal;

code for gradually reducing an attenuation gain of the noise suppressor to zero if the code for analyzing determines the music signal exists in the error signal; and code for attenuating the error signal using the noise suppressor if the code for analyzing determines the music signal does not exist in the error signal.

12. The computer software product of claim 11, further comprising:

code for bypassing the noise suppressor if the code for analyzing determines the music signal exists in the error signal.

13. The computer software product of claim 11, wherein the code for analyzing the error signal includes:

code for defining a music threshold value for a first parameter extracted from a frame of the error signal;

code for defining a background noise threshold value for the first parameter;

code for defining an unsure threshold value for the first parameter, wherein the unsure threshold value falls between the music threshold value and the background noise threshold value;

wherein if the first parameter does not fall between the music threshold value and the background noise threshold value, the code for analyzing classifies the error signal as music if the first parameter is in closer range of the music threshold value than the unsure threshold value; and the code for analyzing classifies the error signal as background noise if the first parameter is in closer range of the background noise threshold value than the unsure threshold value;

wherein if the first parameter falls between the music threshold value and the background noise threshold value, the code for analyzing classifies the error signal as music or background noise based on analyzing a plurality of first parameters extracted from the plurality of frames.

14. A computer readable medium including a computer software product executable by a processor to use music detection for enhancing an operation of an echo canceller and a speech encoder including a pitch interpolation, the echo canceller including an adaptive filter and a nonlinear processor, the computer software product comprising:

code for receiving an input signal including an echo signal by the echo canceller from a near end device;

code for filtering the input signal using the adaptive filter to eliminate linear components of the echo signal in the input signal and generate an error signal;

code for analyzing the error signal using a music detector to determine existence of a music signal in the error signal;

code for bypassing the nonlinear processor if the code for analyzing determines the music signal exists in the error signal;

code for eliminating nonlinear components of the echo signal from the error signal using the nonlinear processor if the code for analyzing determines the music signal does not exist in the error signal;

code for disabling the pitch interpolation if the code for analyzing determines the music signal exists in the error signal;

code for transmitting information to a decoder to disable a pitch interpolation of the decoder if the code for analyzing determines the music signal exists in the error signal; and code for enabling the pitch interpolation if the code for analyzing determines the music signal does not exist in the error signal.

15. A computer readable medium including a computer software product executable by a processor to use music detection for enhancing an operation of an echo canceller and a speech encoder including a pitch pre-processing, the echo canceller including an adaptive filter and a nonlinear processor, the computer software product comprising:

code for receiving an input signal including an echo signal by the echo canceller from a near end device;

code for filtering the input signal using the adaptive filter to eliminate linear components of the echo signal in the input signal and generate an error signal;

code for analyzing the error signal using a music detector to determine existence of a music signal in the error signal;

code for bypassing the nonlinear processor if the code for analyzing determines the music signal exists in the error signal;

code for eliminating nonlinear components of the echo signal from the error signal using the nonlinear processor if the code for analyzing determines the music signal does not exist in the error signal;

code for disabling the pitch pre-processing if the code for analyzing determines the music signal exists in the error signal; and code for enabling the pitch pre-processing if the code for analyzing determines the music signal does not exist in the error signal.

* * * * *